Patented Aug. 16, 1932

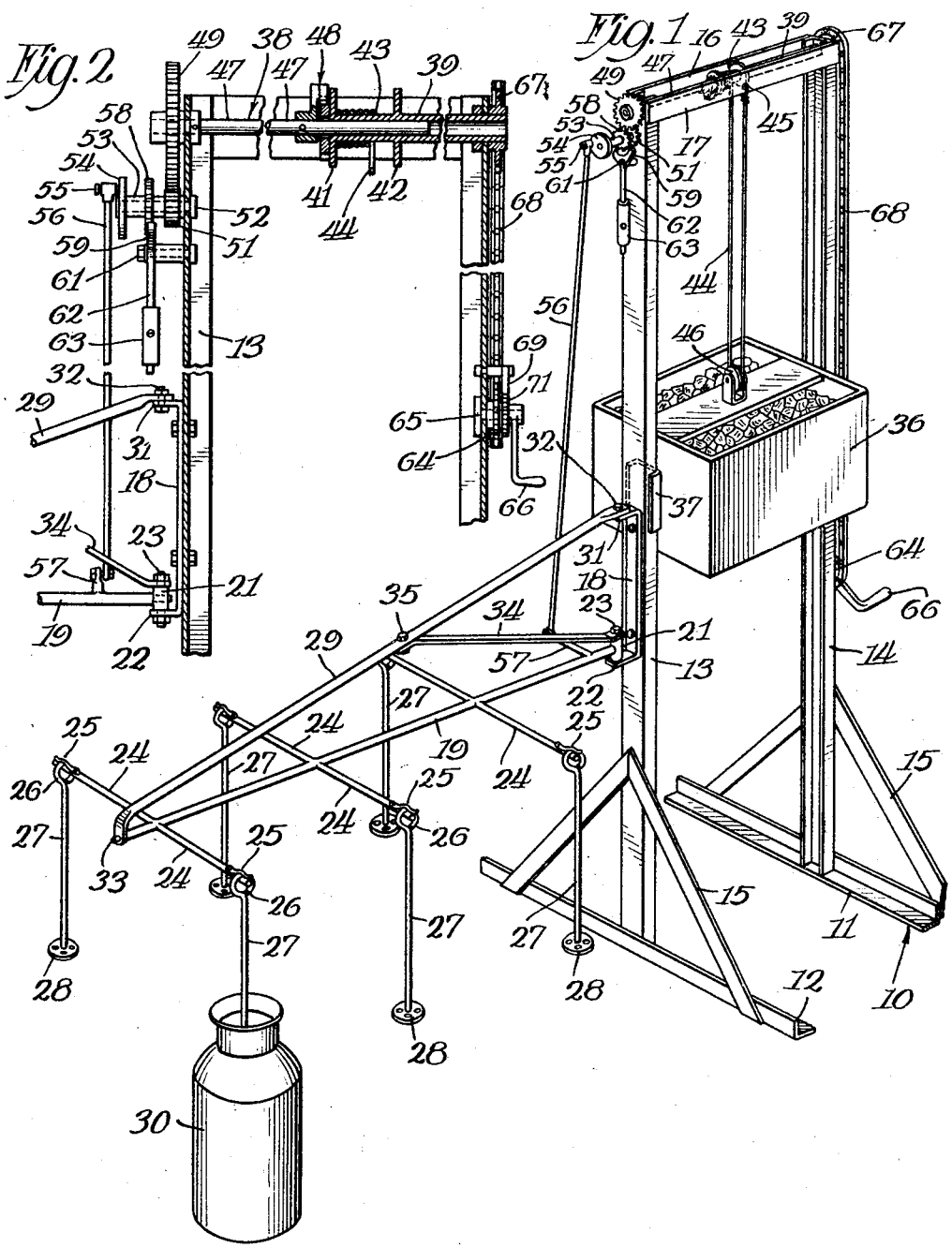

1,872,326

UNITED STATES PATENT OFFICE

AUGUST OTTO, OF SANDWICH, ILLINOIS

MILK STIRRER

Application filed August 20, 1930. Serial No. 476,496.

This invention relates to devices for stirring freshly drawn milk.

One of the objects of the invention is the provision of new and improved means for stirring milk for more rapidly cooling the same, together with novel means for operating the stirring mechanism.

Another object of the invention is the provision of new and improved milk stirring mechanism having novel means for controlling the operation of the mechanism.

A further object of the invention is the provision of a new and improved milk stirring device having a pivotally connected power shaft whereby the same may be moved to different positions for accommodating milk containers arranged at different positions about the device.

A still further object of the invention is the provision of a new and improved milk stirring device that is simple in construction, inexpensive to manufacture, easily assembled, economical to operate, and that is composed of few moving parts.

Other and further objects and advantages of the invention will appear from the following description taken in connection with the accompanying drawing, in which Fig. 1 is a perspective view of the device; and Fig. 2 is a vertical section of the upper portion of the device, with parts broken away.

In order to reduce the growth of bacteria in freshly drawn milk, to a minimum, it is necessary to reduce the temperature of the milk almost immediately after it is drawn, especially in warm weather. While there is little or no bacteria in the milk when first drawn, it soon becomes contaminated by contact with the air and container, and since the temperature of the milk, due to the animal heat, is conducive to rapid spread or growth of the bacteria, it is desirable to reduce the temperature in order to retard the growth as quickly as possible.

This is accomplished by placing the milk in containers of a material of high conductivity, such as metal, and stirring the milk to bring the maximum amount into contact with the heat conducting surface of the container in a minimum amount of time.

The containers or cans are usually placed in troughs or tanks of cool water in order to hasten the cooling operation. Usually fifteen to twenty minutes suffices to reduce the temperature of the milk to a point where the growth of the bacteria is materially retarded.

In large dairy farms, adequate facilities and mechanism are provided for cooling the milk, but for the farmer or small dairy this mechanism is too elaborate and expensive. The present invention is intended to supply an agitating device that is inexpensive and at the same time is simple, efficient and economical to operate.

Referring now to the drawing, the reference character 10 designates generally the base of the machine which comprises a pair of angle bars 11 and 12 on which are mounted the upright standards 13 and 14. Suitable braces 15 may be provided for holding the standards in upright position. Preferably, though not necessarily, the standards are in the form of channel bars opening toward each other, said bars being connected together at their upper ends by a pair of plates 16 and 17 which are attached to each side of the upright members 13 and 14 for receiving the power shaft between them, as will presently appear. By using channel irons the bolt heads and nuts for attaching the operating mechanism to the supports may be placed in and protected by these channels.

Mounted on one of the standards, as 13, is a supporting plate 18 the ends of which are bent outwardly parallel to each other, and to which is connected a countershaft, which in the device shown is in the form of a rocker-shaft 19 for operating the stirrer elements. As shown, means are provided for mounting the rockershaft 19 in such a manner that it may be swung in a horizontal plane to occupy various positions about the supporting standard 13. In the form of construction shown, which is by way of example only, the inner end of the rockershaft 19 is rotatably mounted in a block 21 which in turn is pivotally connected to the lower outwardly extending end 22 of the supporting plate 18 by means of the bolt 23.

The rockershaft 19 is provided with one or more arms 24 extending substantially horizontally therefrom. In the form shown, six arms are employed, although it is understood that the number may be varied as desired. Each of the arms 24 is provided at its outer end with a spring clip 25 for retaining the eye 26 of a stirrer element 27 in position on the end of the arm. Each stirrer element 27 is provided at its lower end with means for agitating the milk, such for instance as the perforated disk 28. These stirrer elements are adapted to extend downwardly into a milk container such as the can 30.

Suitable means are provided for bracing and assisting in supporting the rockershaft 19. In the construction shown, a brace member 29 is provided, having its upper end pivoted to the outwardly extending end 31 of the supporting plate 18, as at 32. This pivot is in alignment with the bolt 23 which connects the pivot block 21 to the lower end 22 of the supporting plate 18, whereby the brace member 29 and rockershaft 19 may be swung horizontally in either direction as a unit.

The outer end of the brace 29 is bent downwardly and provided with an opening for forming a bearing for the reduced end 33 of the rockershaft 19.

Preferably, though not necessarily, an additional brace 34 is rigidly connected to the brace member 29 as at 35 and has its inner end connected to the bolt 23 as clearly shown on the drawing. By means of this arrangement the rockershaft 19 is firmly supported in horizontal position so that it may not only rock but may be swung in a horizontal plane.

Suitable means are provided for rocking the shaft 19 for reciprocating the stirrer elements 27 for agitating the milk in the cans 30. Any suitable mechanism may be employed for that purpose. Preferably a gravity operated device is used because of its simplicity and inexpensiveness.

In the form of construction selected to illustrate one embodiment of the invention, a weight is employed for actuating the operating mechanism. This weight is preferably in the form of a container 36 so that the weight may be varied as occasion may require. In the use of the device the container 36 is adapted to be filled with stones or other objects for giving the desired weight. The container is provided at each end thereof with a guide 37 which engages on the outside of the flanges of the supports 13 and 14. The mechanism for operating the rockershaft 19 by means of the weight will now be described.

Mounted between the plates 16 and 17 at the upper end of the standards 13 and 14 is a power shaft designated generally by the reference character 38. The power shaft 38 comprises a sleeve 39 the inner end of which is provided with a pair of flanges 41 and 42, spaced apart. The portion of the sleeve between the flanges constitutes a drum 43 on which a cord or cable 44 is adapted to be wound. One end of the cable 44 is anchored at the upper end of the standards as at 45 and its other end is connected to the drum 43. The cable extends downwardly about a pulley 46 mounted on the container 36. The other portion of the power shaft 38 is in the form of a rod 47 which has its inner end extending within the sleeve 39 and its outer end journaled at the upper ends of the standards. A pawl and ratchet device 48 is provided between the rod 47 and the sleeve 39 whereby the drum 43 may rotate in one direction independently of the rod 47 as will presently appear.

Mounted on the outer end of the rod 47 is a gear 49 which meshes with the pinion 51 mounted on a journal 52 secured to the standard 13. Secured to the sleeve 53 to which the pinion 51 is keyed is a disk 54 having a crank pin 55 attached eccentrically thereto. Journaled on the crank pin 55 is an operating link 56 the lower end of which is pivotally connected to an arm 57 extending outwardly from the rockshaft 19. By means of this arrangement the shaft 19 is rocked when the drum 43 is actuated by the weight.

In the operation of devices of this nature, it is desirable that a maximum of agitation of the milk be secured, with a minimum expenditure of power, otherwise the distance through which it will be necessary to move the weight will be such as to be objectionable because of the space necessary to accommodate the high standards and because of the extra time and labor involved in elevating the weight.

In the form of construction shown, which is by way of example only, an escapement mechanism is employed for accomplishing this function. This mechanism comprises a ratchet wheel or escapement 58, the teeth of which are adapted to be engaged by an anchor pallet 59 pivoted as at 61. The pallet 59 is provided with an extension 62 on which is adjustably mounted a weight 63. By means of this arrangement the descent of the weight is controlled by the escapement mechanism and its rate of descent may be varied by raising or lowering the weight 63 on the extension 62.

When desirable, the movements of the stirrers may be made substantially continuous by elevating the weight 63 on the extension so that it will move through a very short amplitude of vibration. With this arrangement, each stroke of each stirrer element is hesitant or intermittent. In other words, the stirrer advances for a short interval of time and is held practically stationary for another short interval of time. The milk being agitated during the movement of the stirrer will continue its agitation during the short interval of rest, thereby conserving the power necessary to operate the device. Furthermore, such intermittent motion will tend to break up any periodic movement of the milk which might otherwise occur with uniform movements of the stirrers, thereby increasing the efficiency of the device.

Appropriate means are provided for elevating the weight or winding the mechanism. In the construction shown, a sprocket 64 journaled on a shaft 65 which is rigidly connected to the standard 14 and to which a crank 66 is secured, is employed for this purpose. The outer end of the sleeve 39 is provided with a corresponding sprocket 67 and an endless chain 68 extends about said sprockets and is adapted to be operated by the crank 66 as is usual in such constructions.

The parts are held in adjusted position by a pawl 69 which is adapted to cooperate with a ratchet wheel 71 rigidly connected to the sprocket 64. The parts are so constructed that when the crank 66 is moved in the direction to cause the drum 43 to wind the cable 44, the pawls 48 and 69 will ride over the teeth of the corresponding sprocket.

In the operation of the device, assuming that the stirrers 27 are removed from the corresponding operating arms 24, these stirrers are placed in the cans 30 and the cans are placed in position beneath the arms 24. The rings 26 are then placed on the ends of said arms and forced inwardly past the outer ends of the clips 25 so that they will be held in position on said arms. If the weight has been previously elevated, the pawl 69 is turned out of operative position and the weight 36 will cause the drum 43 to rotate and, through the pawl and ratchet mechanism 48, rotate the shaft 47 for operating the stirrer mechanism. The decent of the weight is controlled by the oscillation of the escapement weight 63 which oscillates in a well known manner to permit intermittent turning of the pinion 51.

When it is desired that the device shall operate more rapidly the weight 63 is elevated on the extension 62, thus shortening the escapement pendulum, and lowered when it is desired that the device shall operate more slowly.

It will be noted that the guide members 37 engage the outer surfaces of the supports 13 and 14. By means of this arrangement the channels of the supports are employed for receiving the ends of bolts, nuts and rivets for the various elements attached thereto.

While I have shown the countershaft in the form of a rocker member, it is understood it may be of other forms such, for instance, as a rotating shaft with cranks for reciprocating the stirrer members. The rocker shaft form, however, is preferred because rocker arms may be extended in opposite directions and each employed for stirring milk, thereby multiplying the capacity of the device without extending the length of the rocker shaft.

It is thought from the foregoing taken in connection with the accompanying drawing that the construction and operation of my device will be apparent to those skilled in the art, and that various changes in size, shape, proportion and details of construction may be made without departing from the spirit and scope of the appended claims.

I claim as my invention:

1. In a milk stirring device, a base, guide means extending upwardly from said base, a weight slidably mounted along said means, a rock shaft, mechanism operated by said weight for rocking said shaft, arms on said shaft, stirrer members engaged by said arms for reciprocating said members, and means including an escapement mechanism engaging said first-named mechanism for controlling the operation of said shaft whereby said stirrer members will be given a uniform intermittent movement during their reciprocation.

2. In a liquid agitating device, a base, a pair of standards extending upwardly from said base, a power shaft carried by said standards, a weight slidably mounted on said standards for operating said shaft, means for elevating said weight, means including an escapement mechanism for controlling the descent of said weight, a countershaft, means for swingingly and rockingly mounting said countershaft on said standards, arms on said countershaft, stirrers connected to said arms, and means for operating said countershaft from said power shaft.

3. In a liquid stirrer device, a pair of standards, a power shaft journaled at the upper end of said standards, said shaft comprising a sleeve and a rod telescoping therewith, said sleeve having a drum thereon, a weight, a cable having one end secured to said drum and its other end anchored at the upper ends of said standards, a pulley on said weight about which said cable extends for elevating said weight, a gear on said shaft, a sleeve member journaled on one of said standards, a pinion on said sleeve meshing with said gear, a crank disk on said sleeve, an escapement mechanism for controlling the operation of said power shaft, a countershaft, means for hinging said countershaft to one of said standards for moving in a horizontal plane, arms on said shaft, stirrer members operated by said arms, means for operating said countershaft from said crank disk, and means for winding up said weight for operating said power shaft.

4. In a liquid agitating device, a support, a shaft extending outwardly from said support, means for rotatably and pivotally mounting said shaft on said support, a brace member pivotally connected to said support and extending outwardly therefrom, the outer end of said shaft being journaled in the outer end of said member, a brace element extending between said member and said first-named means, milk agitating elements, means for operating the same from said shaft, and means for operating said shaft.

5. A milk stirrer comprising supporting means, a weight slidable on said means, a rock-shaft on said means, a milk stirrer element operated by said rock-shaft, means for operating said shaft by said weight, and means for controlling the descent of said weight, said last-named means comprising an escapement wheel, an anchor pallet for engaging said wheel for controlling its rotation, an extension on said pallet rigidly connected thereto, and a weight adjustably mounted on said extension.

6. In a liquid agitating device, a support, a bracket attached to said support, said bracket having its ends bent outwardly and provided with vertically alined openings, a pivot block, means for pivoting the same to one of said ends, a rocker shaft journaled in said block, a brace member pivoted to the other end of said bracket and extending downwardly and outwardly therefrom, said shaft being journaled in the outer end of said member, a brace element extending diagonally downwardly and inwardly from an intermediate portion of said member to said pivot block, a plurality of arms extending laterally from said shaft, clips on the outer ends of said arms, stirrer members having eyes engaging said arms and held thereon by said clips, and means for operating said shaft.

7. In a milk stirring device, a power shaft, a plurality of milk stirrers, means for reciprocating said stirrers from said shaft, and power operated means for controlling the movement of said stirrers, said means causing each of said stirrers to move intermittently during its upward stroke and to move intermittently during its downward stroke for agitating the milk at each intermittent movement of said stirrer.

8. A milk stirring device, comprising a rocking shaft, arms on said shaft, stirrer members operated by said arms, means for oscillating said shaft, escapement mechanism for controlling the operation of said shaft, and means for adjusting said escapement mechanism for changing the rate of oscillation of said shaft.

9. A milk stirring device, comprising a base, guide means extending upwardly from said base, a power shaft carried by said means, means engaging said guide means for rotating said shaft, means for controlling the operation of said shaft for varying its rate of rotation, a countershaft extending laterally from said guide means, a stirrer member, and means operated by said countershaft for vertically reciprocating said member.

10. A milk agitating device, comprising a supporting frame, a power shaft mounted on said frame, means mounted on said frame for operating said shaft, a countershaft extending laterally from said frame, means for oscillating said countershaft from said power shaft, a plurality of stirrer members operated by said countershaft and means pivotally connecting one end of said countershaft to said frame whereby said countershaft may be swung to a plurality of positions in a horizontal plane without affecting the operation of said stirrer members.

In testimony whereof I affix my signature.

AUGUST OTTO.